United States Patent [19]

Hayashi

[11] Patent Number: 4,783,889

[45] Date of Patent: Nov. 15, 1988

[54] TRANSFER MACHINING SYSTEM

[75] Inventor: Shigeru Hayashi, Hiroshima, Japan

[73] Assignee: Mazda Motor Corporation, Hiroshima, Japan

[21] Appl. No.: 121,540

[22] Filed: Nov. 17, 1987

Related U.S. Application Data

[63] Continuation of Ser. No. 11,875, Feb. 6, 1987, abandoned.

[30] Foreign Application Priority Data

Feb. 13, 1986 [JP] Japan ................................. 61-27984

[51] Int. Cl.⁴ ............................................. B23Q 7/00
[52] U.S. Cl. ..................................... 29/33 P; 198/774
[58] Field of Search ...................... 29/563, 33 P, 564; 198/751, 774, 346.2, 341; 409/158, 161; 414/750

[56] References Cited

U.S. PATENT DOCUMENTS

| | | | |
|---|---|---|---|
| 2,804,962 | 9/1957 | Sherman | 198/246.2 |
| 3,642,188 | 2/1972 | Pitzer et al. | 29/564 X |
| 3,666,086 | 5/1972 | Brockmann | 198/774 |
| 4,035,904 | 7/1977 | Ishizaka et al. | 29/563 |
| 4,097,984 | 7/1978 | Petrov | 29/33 P |
| 4,218,815 | 8/1980 | Cumming | 29/563 |
| 4,254,860 | 3/1981 | Koontz | 198/751 |
| 4,294,347 | 10/1981 | Furlette et al. | 198/751 |
| 4,364,471 | 12/1982 | Furlette et al. | 198/751 |
| 4,407,404 | 10/1983 | Rise et al. | 198/774 |
| 4,407,405 | 10/1983 | Rise | 198/774 |
| 4,407,406 | 10/1983 | Norris | 198/774 |
| 4,440,291 | 4/1984 | Brems | 198/488 |
| 4,482,043 | 11/1984 | Bauman et al. | 414/750 X |
| 4,583,634 | 4/1986 | Kraus et al. | 198/341 |
| 4,612,690 | 9/1986 | Baker | 29/33 P |

FOREIGN PATENT DOCUMENTS

| | | | |
|---|---|---|---|
| 83552 | 6/1980 | Japan | 29/564 |
| 58-44151 | 3/1983 | Japan | |
| 59-18712 | 2/1984 | Japan | |
| 59-22219 | 2/1984 | Japan | |
| 59-39153 | 3/1984 | Japan | |
| 59-187436 | 10/1984 | Japan | |
| 79553 | 4/1986 | Japan | 29/563 |
| 78111983 | 6/1980 | Netherlands | 29/563 |
| 831541 | 5/1981 | U.S.S.R. | 29/563 |
| 1013214 | 4/1983 | U.S.S.R. | 29/563 |

Primary Examiner—William Briggs
Attorney, Agent, or Firm—Lynn L. Augspurger

[57] ABSTRACT

A conveyor apparatus intermittently feeds a workpiece a fixed feed stroke in a conveyance direction, a plurality of workpiece pedestals spaced apart by the feed stroke in the conveyance direction support the workpiece until the moment of a subsequent feed operation, and a plurality of machines arranged near respective ones of the pedestals machine the workpiece supported by the pedestal. A walking beam in the conveyor apparatus for receiving the workpiece is moved upward, forward, downward and backward to raise the workpiece supported by one of the pedestals, convey the workpiece to a point above the next pedestal and then lower the workpiece so that the latter is supported by this next pedestal. The supporting position of the pedestal adjacent a machine having a first working area is at a level different from that of the pedestal adjacent a machine having a second working area not the same as the first working area, whereby the workpiece is set at a position which will not interfere with the working areas of machines other than the machine adjacent the pedestal supporting the workpiece.

14 Claims, 6 Drawing Sheets

TRANSFER MACHINING SYSTEM

This is a continuation of co-pending application Ser. No. 07/011,875 filed on 02/06/87, abandoned.

BACKGROUND OF THE INVENTION

This invention relates to a transfer machining system capable of conveying workpieces at a single pitch.

There are cases where a conventional transfer machining system must be equipped with a manufacturing line which includes a mixture of machine tools such as milling machines having a large working area necessary for machining work, and machine tools such as drilling machines having a small working area. The state of the art is such that the various machine tools must be spaced apart at intervals that depend upon the respective working areas.

An example of a prior-art arrangement for conveying workpieces in a manufacturing line of this kind is disclosed in Japanese Utility Model Application Laid-Open (KOKAI) No. 59-39153. The disclosed art includes a plurality of conveyor devices having juxtaposed conveyor bars and is so adapted that the driven conveyor bars are selectively changed whenever necessary. In this manner the pitch at which the workpieces are conveyed can be changed. Owing to such a configuration, however, the conveyor devices are extremely complex and involve complicated control operations. In addition, controlling the operation timing of the machines is a troublesome task.

SUMMARY OF THE INVENTION

Accordingly, an object of the present invention is to provide a transfer machining system that is simply constructed and easy to control in terms of both operation and operation timing.

According to one aspect of the present invention, there is provided a transfer machining system which comprises conveying means for intermittently feeding a workpiece a fixed distance in a conveyance direction, a plurality of supporting means for each supporting the workpiece until the moment of a subsequent intermittent feed, a plurality of these supporting means being arranged in the conveyance direction and spaced apart a distance equivalent to a single intermittent feed distance, and a plurality of machining means arranged in the vicinity of respective ones of the supporting means for subjecting the workpiece supported by the supporting means to predetermined machining, the conveying means including a walking beam for receiving the workpiece, and driving means for moving the walking beam upward, forward, downward and backward, wherein the walking beam is driven by the driving means to raise the workpiece supported by the supporting means from a supported position so as to be released from a supported state on the supporting means, convey the workpiece in the conveyance direction to a point above the next supporting means and thereafter lower the workpiece so that the latter is supported by this next supporting means, one of the plurality of machining means having a first working area, another of the plurality of machining means having a second working area different from the first working area, and a supporting position of supporting means adjacent the machining means having the first working area being at a level different from that of supporting means adjacent the machining means having the second working area, whereby the workpiece is set at a position which will not interfere with the working areas of machining means other than the machining means adjacent the supporting means supporting the workpiece.

Thus, in accordance with the invention, the system is provided with a single conveyance pitch, and both the construction and control of the conveying means and control for starting the operation of the machining means are simplified.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of a transfer machining system according to the present invention will now be described with reference to the drawings.

Figure 1:
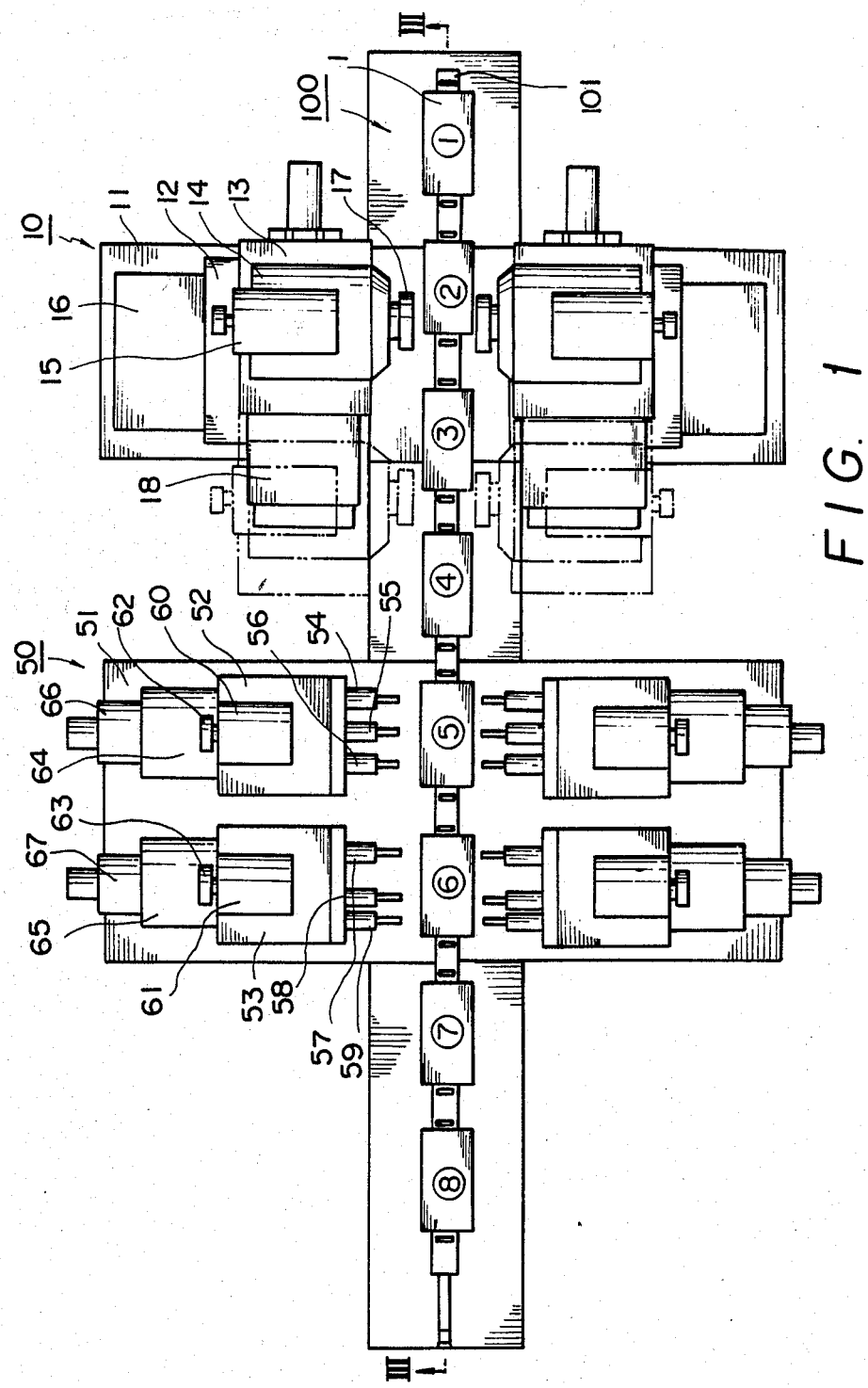
FIG. 1 is a top view schematically illustrating the construction of one embodiment of a transfer machining system according to the present invention.

FIG. 1 is a top view schematically illustrating the construction of a first embodiment of a transfer machining system according to the present invention. The system includes a conveyor apparatus 100 having a lifting and carrying walking beam 101 by which a workpiece 1 is intermittently conveyed from a position indicated by symbol ① to a position indicated by symbol ⑧ in successive steps. The workpiece 1 is subjected to milling work by a milling machine 10 at a position indicated by symbol ③, and to drilling work by a multiple-spindle drilling machine 50 at positions indicated by symbols ⑤ and ⑥. The positions indicated by the other symbols ①, ②, ④, ⑦, ⑧ are idle positions. In the present embodiment, a workpiece pedestal 112 at the position ② is set at a position lower than workpiece pedestals at other positions, as will be described below with reference to FIG. 3. Thus, the workpiece at the position ② is located outside of the working area of the milling machine 10.

The milling machine 10 and multiple-spindle drilling machine 50 are each disposed to bracket the conveyance path of workpiece 1 from both sides. Since the arrangement is the same on both sides, only the machinery on one side of the conveyor apparatus 100 in FIG. 1 shall be described, a description of the machinery on the other side being omitted.

The milling machine 10 will be described first. The milling machine 10 has a base 11 fixedly provided on a foundation, not shown. Provided on the base 11 are an X table 12 slidable in a direction (up and down in FIG.

1) perpendicular to the workpiece conveyance direction (the direction in which the walking beam 101 extends, namely the left-right direction in FIG. 1), and a Y table 13 slidable in the workpiece conveyance direction on a saddle 18 carried on the X table 12. Arranged on the Y table 13 is a column 14 having a drive motor 15 fixedly supported thereon. The motor 15 has a drive shaft and the column 14 has a spindle, neither of which are shown. A belt 16 is wound around and stretched between the drive shaft and spindle for transmitting the rotation of the former to the latter. The column 14 is further provided with a side milling cutter 17, which is attached to the column spindle rotated by the drive motor 15 via the belt 16.

The process for milling the workpiece 1 includes advancing the workpiece 1 by a known method to a position on a workpiece pedestal 111 at position ①, and then subjecting the workpiece 1 to a conveyance operation, described below, in accordance with a characterizing feature of the invention, whereby the workpiece is conveyed to and placed on a workpiece pedestal 113 at position ③. The milling machine 10 is then moved from the position indicated by the solid lines to the position indicated by the phantom lines by movement of the Y table 13 in the conveyance direction.

The side surface of workpiece 1 located at position 3 is milled by movement of the milling machine 10. Milling ends when the milling machine 10 moves to e.g. the position indicated by the phantom lines. When milling ends, the X table 12 is moved to retract the column 14 upward in FIG. 1 away from the side surface of the workpiece 1! ,and the Y table 13 is slid rightward again in FIG. 1. Thus, when the next workpiece is conveyed to and positioned at position ③, the milling machine 10 is moved and restored to the position indicated by the solid lines in FIG. 1 so that milling of a subsequent workpiece may be repeated without delay.

If the workpiece 1 at position ② were to be at a height the same as that of a workpiece at position ③ at this time, the presence of the former at position ② would be an impediment to the machining of the latter by the milling machine 10 at position ③. Therefore, in accordance with this embodiment, the workpiece 1 at position ② is held at a lower level outside the working area of the milling machine 10 so that the workpiece at position ③ can be machined without impediment. This will be described below in further detail.

The relative positional relationship of the workpieces at positions ② and ③, as well as the construction of the conveyor 100, will now be described with reference to the right-side view of FIG. 2 and front view of FIG. 3.

Figure 2:
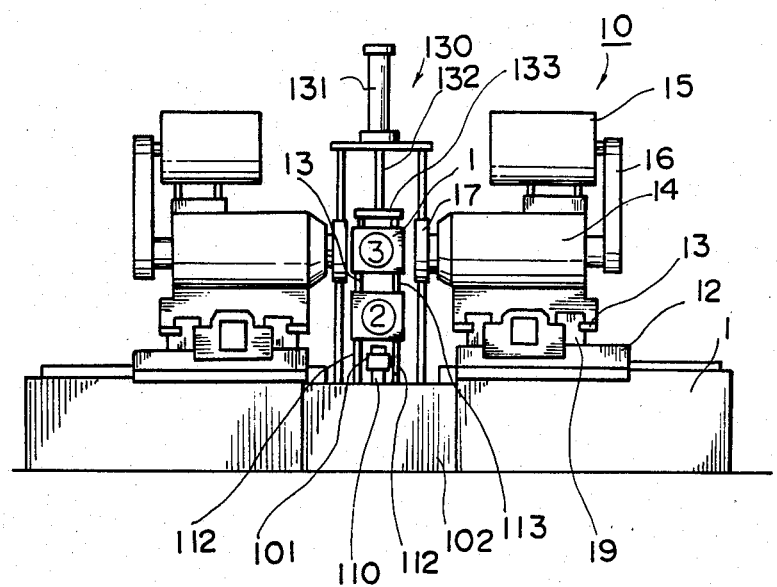
FIG. 2 is a side view of the machining system shown in FIG. 1.

The workpiece indicated by symbol 2 in FIG. 2 represents a workpiece positioned and retained by a workpiece pedestal 112 at the position 2 , and a workpiece indicated by symbol 3 represents a workpiece positioned and retained by the workpiece pedestal 113 at the position 3 .

As mentioned earlier, the conveyor apparatus 100 includes the walking beam 101 on the upper surface of which a plurality of the workpieces 101 are placed to be conveyed intermittently thereby. Provided equidistantly on the upper surface of the walking beam 101 are pairs of engaging ribs 101a for engaging both ends of each workpiece in the conveyance direction. In order to move the walking beam 101 up and down, a plurality of elevating arms 103a through 103d are rotatably juxtaposed in the conveyance direction below the walking beam 101.

Attached to the distal end of each of the elevating arms 103a through 103d is a roller 110 which comes into abutting contact with the lower surface of walking beam 101 to determine its vertical position. An elevating arm support beam 104 extending horizontally in the conveyance direction is provided astride two side walls 102a, 102b upstanding from the foundation. Each of the elevating arms 103a through 103d is freely pivotally supported at its intermediate portion on the support beam 104 by a pin 105. For the sake of the description, the workpiece 1 at position ① and the workpiece pedesal 111 are deleted from FIG. 2.

As shown in FIG. 2, an urging mechanism 130 for pressing down on and retaining the workpieces supported on workpiece pedestals 113, 115, 117 is arranged above each of these pedestals 113, 115, 116, which support the workpieces machined by the respective machining devices. Each workpiece urging mechanism 130 comprises a hydraulic cylinder 131, a piston 132 attached to the cylinder 131 and moved up and down by the hydraulic pressure developed by the cylinder 131, and an engaging member 133 fixed to the lower end of the piston 132 for abutting against the upper surface of the workpiece supported on the corresponding workpiece pedestal 113, 115 or 116 to pressingly retain the same.

Figure 3:
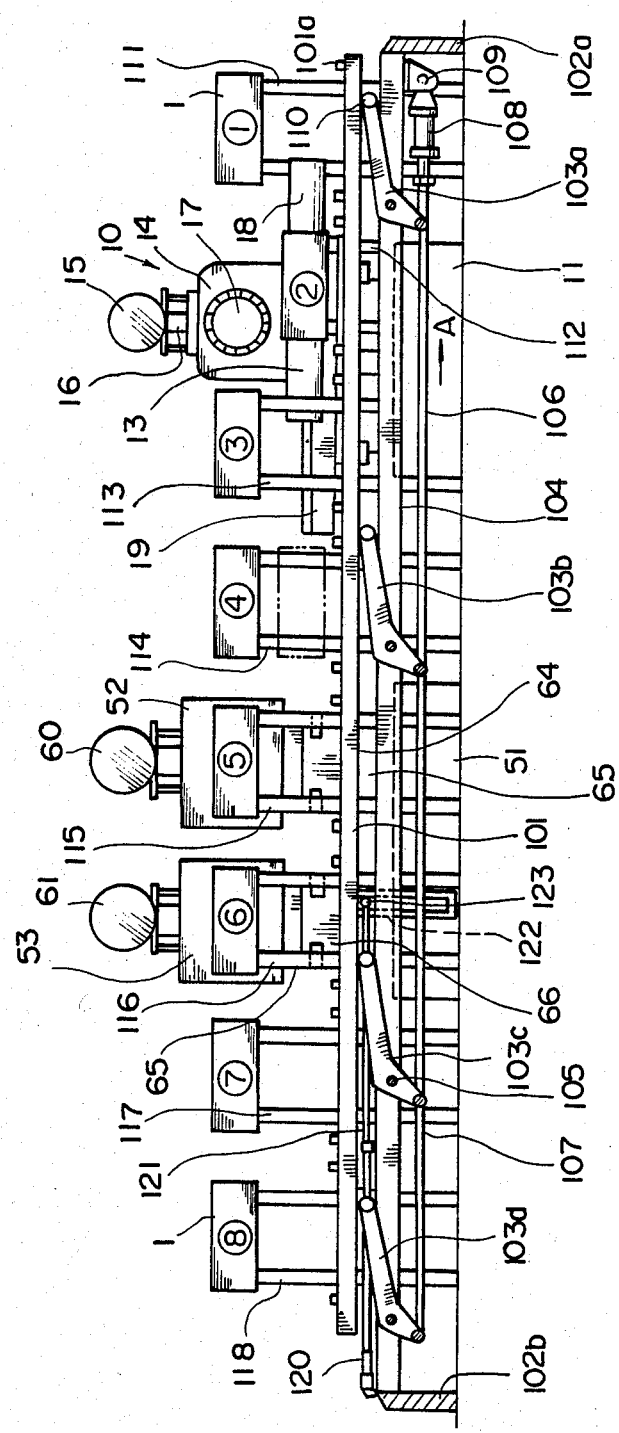
FIG. 3 is a front view seen from side III—III in FIG. 1.

As shown in FIG. 3, the lower end of each of the elevating arms 103a through 103d is pivotally connected via a pin 107 to a horizontally extending connecting rod 106. It should be noted that the urging mechanisms 130 are not shown in FIG. 3 on account of space considerations One end of the connecting rod 106 is connected to a first drive cylinder 108 for elevating purposes. Thus, actuating the first drive cylinder 108 causes the cylinder to reciprocate the connecting rod 106 horizontally. The first drive cylinder 108 is secured via a cylinder mount 109 to one end portion (the right end in FIG. 3) of the elevating arm support beam 104 at the lower surface thereof.

Thus, the elevating arms 103a through 103d are rocked back and forth about their respective pins 105 by actuating the first drive cylinder 108. Furthermore, the walking beam 101, which is contacted at its lower surface by the rollers 110 at the ends of the elevating arms 103a through 103d, is moved up and down in dependence upon the rocking motion of the arms 103a through 103d.

The workpiece pedestals 111 through 118 for receiving workpieces at the positions ① through ⑧ upstand on both sides of the walking beam 101 at locations corresponding to the positions ① through ⑧. A second drive cylinder 120 for reciprocating the walking beam 101 longitudinally is arranged below the other end (the left end in FIG. 3) of the beam 101 and is secured to the other side wall 102b. Arranged below the walking beam 101 is a transverse motion rod 121 connected to the second drive cylinder 120 and reciprocated horizontally thereby.

An elevator guide 122 for regulating movement of the walking beam 101 in the conveyance direction in secured in a depending state to the lower surface of the beam 101 at substantially the intermediate portion thereof. The guide 122 is formed to include a vertically extending guide groove in which a positioning roller 123 mounted on the distal end of the transverse rod 121 is fitted. Movement of the walking beam 101 in the longitudinal (conveyance) direction is regulated by thus fitting the positioning roller 123 of transverse rod 121 in the guide groove of elevator guide 122, as a result of which the walking beam 101 is reciprocated longitudinally via the guide 122 by actuating the second drive cylinder 120.

As shown in FIG. 2, the walking beam 101 has a width less than the spacing between each of the workpiece pedestals 112, 113 and is so disposed as to be situated between each of the workpiece pedestals 112, 113. Thus, by actuating the two drive cylinders 108, 120, the walking beam 101 is reciprocated while being moved up and down between each of the pedestals 112, 113 so as to receive workpieces that have been placed on these pedestals. In this manner, workpieces received by the walking beam 101 are intermittently conveyed to mutually adjacent workpiece pedestals 111 through 118 in successive fashion.

It should be noted that the workpiece at position ② is outside the working area of the milling machine 10, as illustrated in FIG. 2, and therefore will not become an obstacle when the milling machine 10 is moved to the side of position ② to execute a machining operation.

As shown in FIGS. 1 and 3, the multiple-spindle drilling machine 50 has saddles 66, 67 juxtaposed in the conveyance direction on a base 51 upstanding from the foundation. Tables 64, 65 slidable toward and away from the walking beam 101 (up and down in FIG. 1) are arranged on the saddles 66, 67, respectively. The tables 64, 65 carry respective columns 52, 53 secured thereto, the columns having respective spindles, not shown. Drive motors 60, 61 having drive shafts (not shown) are mounted on the respective columns 52, 53, and belts 62, 63 are wound about and stretched between the drive shafts of motors 60, 61 and spindles of columns 52, 53, respectively. Thus, a rotative driving force from each of the drive motors 60, 61 is transmitted to the corresponding spindle via corresponding ones of the belts 62, 63. Rotating one of these spindles drives into rotation a plurality of spindles 54 through 56 in which the ends of drill bits are mounted, and rotating others of these spindles drives into rotation a plurality of spindles 57 through 59 in which the ends of drill bits are mounted.

When drilling is performed, the columns 52, 54 are slid on the respective saddles 66, 67 toward the walking beam 101 (downward in FIG. 1), whereby the columns 52, 53 are moved toward the workpiece 1 from the state shown in FIG. 1 while the spindles 54 through 59 to which the drill bits are attached are rotated. Thus, the drill bits are brought into pressing contact with the side face of the workpiece 1 at position ⑤ or ⑥ to drill the required holes into the workpiece. When drilling ends, the columns 52, 53 are slid on the respective saddles 66, 67 away from the walking beam 101 (upward in FIG. 1) to be retracted from the drilled workpiece. Then, when the next workpiece has been conveyed to position ⑤ or ⑥, drilling is carried out just as described above.

The operation of the conveyor apparatus 100 constructed as set forth above will now be described.

The conveyor apparatus 100 is in the state shown in FIG. 3 when not in operation, namely when machining is not being performed. The first step is for the workpiece 1 to be conveyed in and placed upon the workpiece pedestal 111 at position ① by pre-conveyance conveyance means, not shown. When the workpiece 1 is to be conveyed from this state to the next position ②, the first cylinder 108 is actuated to move the rod 106 in the direction of arrow A (FIG. 3). Accompanying this motion, the elevating arms 103a through 103d are rocked about the respective pins 105 implanted in the elevating arm support beam 104, whereby each roller 110 moves along a circle whose center is the pin 105. Thus, the rollers 110 urge the walking beam 101 upwardly from therebelow.

At this time, movement of the walking beam 101 in the conveyance (longitudinal) direction is limited by the engagement between the elevator guide 122 and positioning roller 123, so that the walking beam 101 rises while its position remains fixed with respect to the conveyance direction. As a result, workpieces 1 supported by the workpiece pedestals 111 through 118 are received by the walking beam 101 while being positioned by the pairs of ribs 101a. Thus, the walking beam 101 frees the workpieces 1 from workpiece pedestals 111 through 118 and raises them further.

The elevation of the walking beam 101 due operation of the first drive cylinder 108 is carried out until the beam 101 reaches a position higher than the upper ends of the workpiece pedestals 111 and 113 through 118, other than the workpiece pedestal 112 at position ②, in order to receive all of the workpieces 1 thereon. By thus elevating the walking beam 101, all of the workpieces 1 supported on the workpiece pedestals 111 through 118 are received by and positioned on the beam 101.

Next, the second drive cylinder 120 is actuated to move the transverse rod 121 in the conveyance direction (leftward in FIG. 3). The amount of rod movement is set to agree with the spacing between the positions at which the workpiece pedestals 111 through 118 are installed. By thus setting the amount of movement, the walking beam 101 carrying the workpieces 1 thereon will convey the workpieces exactly to points over the immediately adjacent ones of the workpiece pedestals 111 through 118 due to the engagement between the elevator guide 122 and positioning roller 123.

The first drive cylinder 108 is now actuated again to move the rod 06 in the conveyance direction, namely leftward in FIG. 3. This is again accompanied by rocking movement of the elevating arms 103a through 103d back to the positions shown in FIG. 3 about the respective pins 105. Owing to the engagement between the elevator guide 122 and the positioning roller 123, the walking beam 101 is regulated in terms of its movement in the conveyance direction and descends while its longitudinal position is maintained.

The workpieces 1 received by the walking beam 101 are thus moved so as to be placed on and supported by the workpiece pedestals 111 through 118. After the workpieces 1 are transferred to the workpiece pedestals 111 through 118, the first drive cylinder 108 moves the rod 106 leftward in FIG. 3 in the direction of conveyance so that the elevating arms 103a through 103d assume the states depicted in FIG. 3. At this time the first drive cylinder 108 is actuated to lower the walking beam 101 to a position below the workpiece supporting positions of all of the workpiece pedestals 111 through 118, namely to a position lower than that of the upper end of workpiece pedestal 112 at position ②.

Next, the second drive cylinder 120 is actuated to move the transverse motion rod 121 in a direction opposite to that of the conveyance direction, namely rightward in FIG. 3, over a distance equal to the spacing at which the workpiece pedestals 111 through 118 are arranged. Owing to the engagement between the elevator guide 122 and positioning roller 123, the walking beam 101 also is moved rightward in FIG. 3 over a distance equal to the spacing at which the workpiece pedestals 111 through 113 are arranged in response to actuation of the second drive cylinder 120, and is thereby moved to the position (the position shown in FIG. 3) occupied prior to the start of conveyance.

Figure 4:
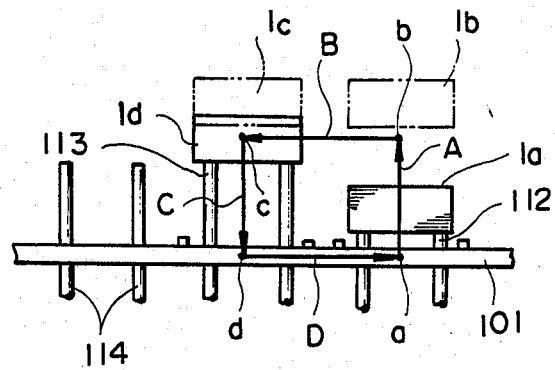
FIG. 4 is a front view illustrating movement of a walking beam in the present embodiment.

The above-described motion of the walking beam 101 is illustrated schematically in FIG. 4. In FIG. 4, numeral 1a denotes a workpiece placed on the workpiece pedestal 112 at the position ②, 1b the workpiece at its uppermost position at position ②, 1c the workpiece at its uppermost position at position ③, and 1d the workpiece placed on the workpiece pedestal 113 at position ③. The working beam 101 is elevated from a position shown at a set below the workpiece 1a to a position shown at b limiting upward movement of the workpiece 1b, as illustrated by arrow A. The beam is then slid from the position b to a position shown at c limiting movement of the workpiece, as illustrated by arrow B. Next, the beam is lowered from the position c to a position shown at d, which is at the same height as the position a, as shown by arrow C. Finally, the beam is slide from position d to position a to be restored to its original position, as illustrated by arrow D. Thus, the walking beam 101 is moved in the above-described sequence to intermittently convey the workpieces 1 successively from one workpiece pedestal to the next workpiece pedestal at the adjacent position.

In accordance with the sequence in which the walking beam 101 is moved, each workpiece 1 is intermittently conveyed (transferred) reliably in the above manner even between workpiece pedestals at the same height, e.g. between the pedestal 113 at position 3 and the pedestal 114 at position 4.

The present invention is not limited to the arrangement of the above-described embodiment but can be modified in various ways without departing from the scope of the claims.

For example, in the foregoing embodiment, it is mentioned that only the workpiece pedestal 112 at position ② is arranged at a lower level outside the working area of milling machine 10. However, if the workpiece at position ④ is also within the working area of the milling machine 10, then an arrangement can be adopted in which the workpiece pedestal 114 at position 4 is situated at a lower level, as indicated by the phantom lines in FIG. 3, just as the workpiece pedestal 112 at position ②.

Figure 5:
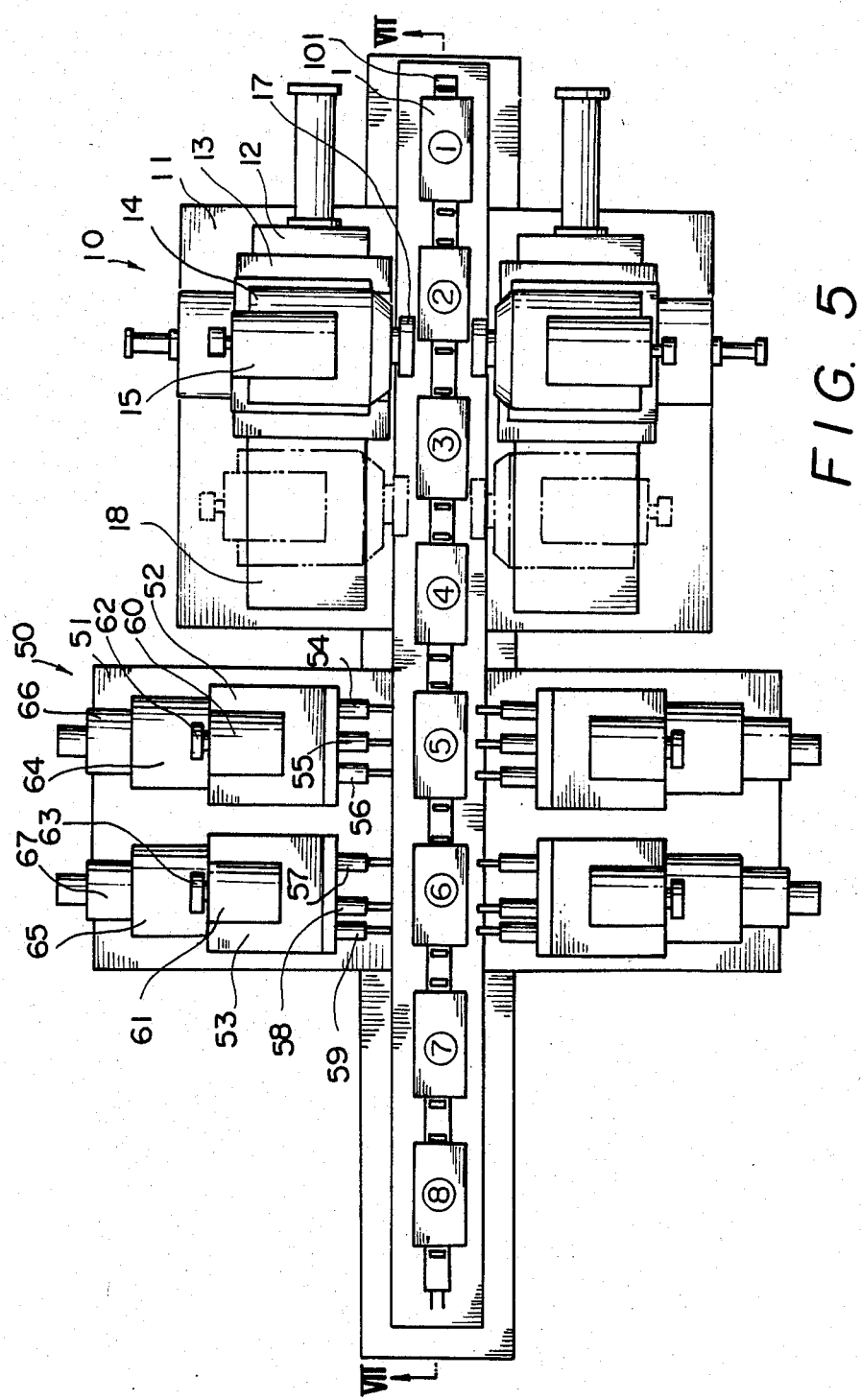
FIG. 5 is a top view schematically illustrating the construction of the other embodiment of a transfer machining system according to the present invention.
Figure 6:
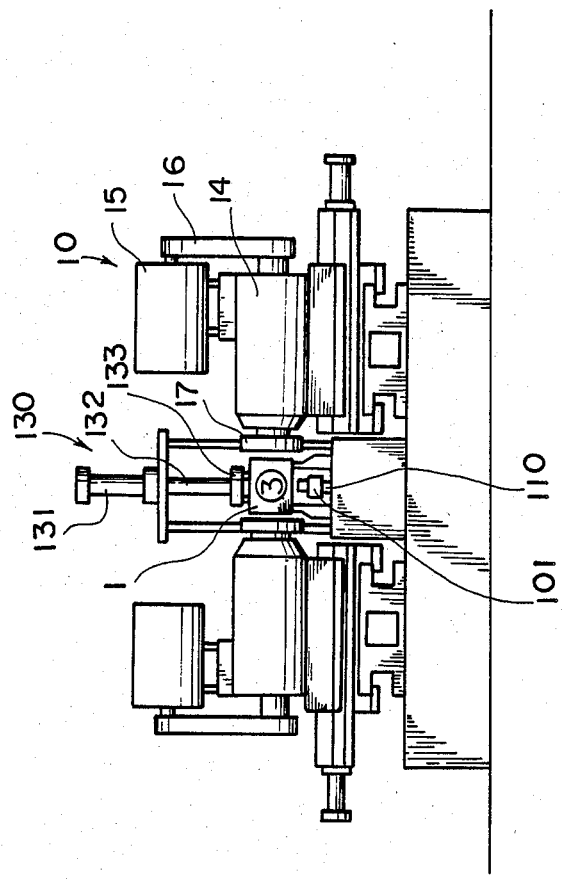
FIG. 6 is a side view of the machining system shown in FIG. 5.
Figure 7:
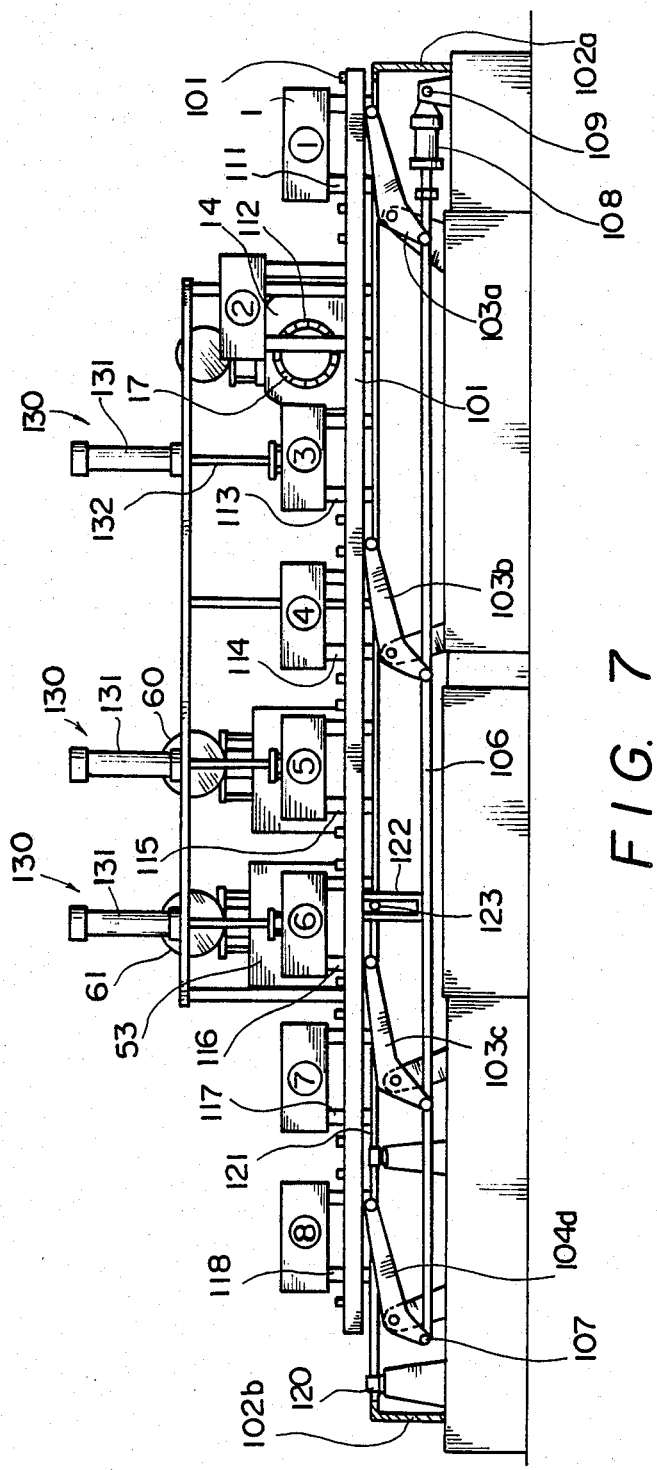
FIG. 7 is a front view seen from side VII—VII in FIG. 5.

Further, as shown in a second embodiment depicted in FIGS. 5 through 7 it can be arranged so that the workpiece 1 avoids the working area of milling machine 10 by traveling above the working area rather than below. In accordance with this embodiment, elevation of the walking beam 101 by the first drive cylinder 108 and elevating arms 103 is controlled in such a manner that the walking beam 101 is brought to a height greater than that of the upper end of the workpiece pedestal situated above the working area of milling machine 10. With such an arrangement, it is possible for the height of the workpiece pedestals at positions other than position ② to be kept low. This makes it possible to prevent a decline in the receiving rigidity of the pedestals which have received the workpieces 1, thus enabling the precision at which the workpieces are machined to be maintained.

With the exception of the points mentioned above, the construction of the second embodiment is the same as that of the first embodiment. Therefore, portions of the second embodiment similar to those of the first embodiment are designated by like reference characters and need not be described again.

In the above-described embodiments, positions other than those at which machining is performed are idle positions. However, the invention is not so limited, for a variety of machining tools can be installed at these idle positions, whereby machining can be performed at all of the workpiece pedestal positions so that none of these positions are left idle.

Further, the invention is not limited to the arrangement wherein the milling machine 10 is moved from position ② toward position ④ to perform milling, as in the foregoing embodiments. The milling machine 10 can just as well be moved from position ④ to position ② to carry out milling.

In addition, the machines are not limited to those described above; the types of machines can be selected at will.

Thus, in accordance with the present invention as described in detail above, a simply constructed conveyor apparatus can be provided in which the pitches at which workpieces are conveyed by the walking beam are all made the same. As a result, there is provided a transfer machining system in which the starting timings of the machines can all be set to the same timing and controlled in a very easy manner.

What is claimed is:

1. A transfer machining system, comprising:
   conveying means for intermittently feeding a workpiece a fixed distance in a conveyance direction;
   a plurality of supporting means for each supporting the workpiece until the moment of a subsequent intermittent feed, a plurality of said supporting means being arranged in the conveyance direction and spaced apart a distance equivalent to a single intermittent feed distance; and
   a plurality of machining means arranged in the vicinity of respective ones of said supporting means for subjecting the workpiece supported by said supporting means to predetermined machining;
   said conveying means including
      a walking beam for receiving the workpiece, and driving means for moving said walking beam upward, forward, downward and backward, wherein said walking beam is driven by said driving means to raise the workpiece supported by said supporting means from a supported position so as to be released from a supported state on said supporting means, to convey the workpiece in the conveyance direction to a point above the next supporting means and thereafter to lower the workpiece so that the workpiece is supported by this next supporting means;
   one of said plurality of machining means having a first working area;
   a supporting position of said supporting means near said machining means having the first working area being at a level different from that of supporting means adjacent said supporting means which is set near said machining means having the first working area, whereby the workpiece is set at a position which will not interfere with the first working area relative to said supporting means adjacent the supporting means which is corresponding to said machining means, 1
   the machining means having the first working area having a side milling machining, and further comprising driving means connected to said side milling machine for moving said side milling machine toward and away from a workpiece supported on supporting means located near said side milling machine, and for reciprocating said side milling machine in the conveyance direction.

2. The transfer machining system according to claim 1, wherein said plurality of machining means are arranged on one side of said walking beam.

3. The transfer machining system according to claim 2, wherein the supporting means near said side milling machine is located at such a level that it will be spaced from supporting means adjacent the supporting means near said side milling machine by a distance at least greater than the thickness of the workpiece supported by the supporting means.

4. The transfer machining system according to claim 3, wherein another of said plurality of machining means has a second working area different form the first working area said machining means having said first working area, and wherein said another machine means having the second working area is arranged on one side of said walking beam and is set at a height equal to a height at which the side milling machine is set.

5. A transfer machining system comprising:

conveying means for intermittently feeding a workpiece a fixed distance in a conveyance direction from a transfer machining position of said transfer machining system to another transfer machining position of said transfer machining system;

a plurality of supporting means for transfer machining position of said transfer machining system, each for supporting the workpiece in position at the transfer machining position until the moment of a subsequent intermittent feed, said plurality of said supporting means being arranged in the conveyance direction and spaced apart a distance equivalent to a single intermittent feed distance; and a plurality of machining means arranged on one side of a walking beam in the vicinity of respective ones of said supporting means for subjecting the workpiece supported by said supporting means to predetermined machining at a transfer machining position;

said conveying means for conveying a workpiece between transfer machining positions, including
said walking beam for receiving the workpiece, and
driving means for moving said walking beam upward, forward, downward and backward, wherein said walking beam is driven by said driving means to raise the workpiece supported by said supporting means from a supported position so as to release said workpiece from a supported state on said supporting means, to convey the workpiece in the conveyance direction to a point above the next supporting means and thereafter to lower the workpiece so that the workpiece is supported by the said next supporting means;

one of said plurality of machining means having side milling machine and a first working area at a transfer machining position; and a workpiece supporting level position of supporting means at the transfer machining position near said one machining means having the first working area being at a level different from that of supporting means of another workpiece position of an adjacent said transfer machining position supporting means, which said adjacent supporting means is set near said machining means of the transfer machining position having the first working area, whereby a workpiece when set in position at said different level on said adjacent supporting means will not interfere with workpiece machining in the first working area, which further comprises:

driving means connected to said side milling machine for moving said side milling machine toward and away from a workpiece supported on supporting means near said side milling machine, and for reciprocating said side milling machine in the conveyance direction.

6. The transfer machining system according to claim 5, wherein the supporting means near said side milling machine is located at such a level that it will be spaced from supporting means adjacent this first-mentioned supporting means by a distance at least greater than the thickness of the workpiece supported by the supporting means.

7. The transfer machining system according to claim 6, wherein said machining means having the second working area is arranged on one side of said walking beam and is set at a height equal to a height at which the side milling machine is set.

8. The transfer machining system according to claim 7, which further comprises:

workpiece urging means provided for corresponding ones of the supporting means near said machining means for urging workpieces supported by said supporting means and retaining the workpieces on these supporting means.

9. The transfer machining system according to claim 5, wherein the supporting position of the supporting means near said machining means having the first working area is set so as to be lower than the supporting means adjacent this first-mentioned supporting means.

10. The transfer machining system according to claim 5, wherein said driving means comprises first driving means for raising and lowering said walking beam, and second driving means for reciprocating said walking beam in the conveyance direction.

11. A transfer machining system comprising:

conveying means for intermittently feeding a workpiece a fixed distance in a conveyance direction form a transfer machining position of said transfer machining system to another transfer machining position of said transfer machining system;

a plurality of supporting means for transfer machining positions of said transfer machining system, each for supporting the workpiece in position at the transfer machining position until the moment of a subsequent intermittent feed, said plurality of said supporting means being arranged in the conveyance direction and spaced apart a distance equivalent to a single intermittent feed distance; and a plurality of machining means arranged in the vicinity of respective ones of said supporting means for subjecting the workpiece supported by said supporting means to predetermined machining at a transfer machining position;

said conveying means for conveying a workpiece between transfer machining positions, including
a walking beam for receiving the workpiece, and
driving means for moving said walking beam upward, forward, downward and backward, wherein said walking beam is driven by said driving means to raise the workpiece supported by said supporting means from a supported position so as to release said workpiece from a supported state on said supporting means, to convey the workpiece in the conveyance direction to a point above the next supporting means and thereafter to lower the workpiece so that the workpiece is supported by the said next supporting means;

one of said plurality of machining means having a first working area at a transfer machining position; and a workpiece supporting level position of supporting means at the transfer machining position near said one matching means having the first working area being at a level different from that of supporting means of another workpiece position of an adjacent said transfer machining position supporting means, which said adjacent supporting means is set near said machining means of the transfer machining position having the first working area, whereby a workpiece when set in position at said different level on said adjacent supporting means will not interfere with workpiece machining in the first working area.

12. The transfer machining system according to claim 11, wherein the supporting position of the supporting means near said machining means having the first working area is set so as to be higher than the supporting means adjacent this first-mentioned supporting means.

13. The transfer machining system according to claim 12, wherein the machining means having the first working area has a side milling machine.

14. The transfer machining system according to claim 4, which further comprises:

workpiece urging means provided for corresponding ones of the supporting means near said machining means for urging workpieces supported by said supporting means and for retaining the workpieces on these supporting means.

* * * * *